(12) United States Patent
Guinois et al.

(10) Patent No.: US 9,540,056 B2
(45) Date of Patent: Jan. 10, 2017

(54) DEFLECTOR DEVICE AND MOTOR VEHICLE IN WHICH THE FRONT SHIELD CARRIES SAID DEFLECTOR DEVICE

(71) Applicant: Compagnie Plastic Omnium, Lyons (FR)

(72) Inventors: Pascal Guinois, Bruyeres le Chatel (FR); Laurent Drouot, Saint Pierre du Perray (FR); Philippe Gilotte, Benonces (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 14/420,154

(22) PCT Filed: Jul. 31, 2013

(86) PCT No.: PCT/EP2013/066088
§ 371 (c)(1),
(2) Date: Feb. 6, 2015

(87) PCT Pub. No.: WO2014/023630
PCT Pub. Date: Feb. 13, 2014

(65) Prior Publication Data
US 2015/0284039 A1    Oct. 8, 2015

(30) Foreign Application Priority Data

Aug. 10, 2012 (FR) ...................................... 12 57751

(51) Int. Cl.
*B62D 35/00* (2006.01)
*B62D 35/02* (2006.01)

(52) U.S. Cl.
CPC ............. *B62D 35/02* (2013.01); *B62D 35/005* (2013.01)

(58) Field of Classification Search
CPC ............................. B62D 35/02; B62D 35/005
See application file for complete search history.

(56) References Cited

U.S. PATENT DOCUMENTS

| | | | |
|---|---|---|---|
| 7,686,383 | B2 | 3/2010 | Tortosa-Boonacker |
| 2010/0052361 | A1 | 3/2010 | Tortosa-Boonacker |

FOREIGN PATENT DOCUMENTS

| | | |
|---|---|---|
| DE | 9400342 U1 | 5/1994 |
| DE | 102009034518 A1 | 1/2011 |
| EP | 1541452 A1 | 6/2005 |
| FR | 2821593 A1 | 9/2002 |
| FR | 2864811 A1 | 7/2005 |
| FR | 2927303 A1 | 8/2009 |
| JP | H0378686 U | 8/1991 |

*Primary Examiner* — Lori L Lyjak
(74) *Attorney, Agent, or Firm* — Jacox, Meckstroth & Jenkins

(57) ABSTRACT

A mobile deflector device of a curved vehicle shield, comprising a central deflector and two lateral deflectors, essentially forming three chords distributed over the entire length of the shield. Each of the three deflectors is mounted such as to be able to pivot between a folded position and a second unfolded position substantially perpendicular to the first position.

19 Claims, 2 Drawing Sheets

DEFLECTOR DEVICE AND MOTOR VEHICLE IN WHICH THE FRONT SHIELD CARRIES SAID DEFLECTOR DEVICE

CROSS-REFERENCE TO RELATED APPLICATIONS

This application claims priority to PCT Application No. PCT/EP2013/066088 filed Jul. 31, 2013, which claims priority to the French application 1257751 filed on Aug. 10, 2012, which applications are incorporated herein by reference and made a part hereof.

BACKGROUND OF THE INVENTION

1. Field of the Invention

This invention relates to a motor vehicle whose front shield comprises several deflectors mounted such as to be able to pivot between a folded position under the front shield and a position in which the deflectors project downwards.

2. Description of the Related Art

Vehicles comprising such deflectors are described, for example, in French Patents Nos. 2 821 593, 2 927 303 and 2 864 811.

Such deflectors are designed to reduce the drag of the vehicle and its consumption especially at high speed.

When the deflectors are in the folded position under the front shield, they are protected from impacts against obstacles such as curbs.

This folded position under the shield is therefore suitable for low-speed driving in cities or on roads with dips and bumps.

Such deflectors are particularly useful on vehicles with a high ground clearance such as 4-wheel drive vehicles.

These vehicles, in fact, consume a lot of fuel due to the high drag caused by the ground clearance

SUMMARY OF THE INVENTION

The objective of this invention is to provide improvements to the known pivoting deflectors.

This objective is achieved, according to the invention, through a mobile deflector device of a curved vehicle shield comprising a central deflector and two lateral deflectors, essentially forming three chords distributed over the entire length of the shield, each of the three deflectors being mounted so as to be able to pivot between a folded position and a second unfolded position substantially perpendicular to the first position.

Thus the deflector covers not only the bottom line at the front, in an essentially straight area but covers the entire bottom line at the front, highly curved, including the two returns to the wheels. This provides a barrier which projects well forward, up to the wheels, to drive the air towards the sides. It is this combination of a barrier at the front, along the entire length, which makes the deflector truly efficient.

When the three deflectors are mounted on the front shield in the first position, i.e. folded under the front shield, these deflectors are protected from impacts and the vehicle can travel in cities, or on bad roads or tracks without any risk of damaging the deflectors.

When the three deflectors are in the second position, i.e. folded downwards, they effectively reduce the drag of the vehicle especially when it is travelling at high speed. This high efficiency of the deflectors results in particular from the fact that they are distributed over the entire width of the front central part and the lateral sides of the front shield.

The 3 deflectors can be aligned (with therefore, in unfolded position, the same Z value of their bottom line). Alternatively, the lateral deflectors can "descend" higher or lower than the front deflector. The reduction in aerodynamic drag is particularly enhanced if these lateral deflectors descend lower than the front deflector, in other words if the ground clearance defined by these lateral deflectors is less than that defined by the front deflector.

Preferably, each of the two lateral deflectors is hinged about an axis forming an angle with the pivoting axis of the central deflector.

Also preferably, the deflector device comprises means for controlling the pivoting of the three deflectors.

These control means may comprise at least one geared motor and rods or cables driven by the geared motor and connected to the two lateral deflectors.

In an alternative embodiment, the control means comprise two geared motors, each being directly connected to one of the two lateral deflectors.

In an advantageous embodiment of the invention, the two lateral deflectors are each connected to the central deflector by means for driving this central deflector as they pivot between the first and second positions.

These means simplify manufacture by avoiding the use of special rods or cables to control the pivoting of the central deflector.

In another embodiment, the pivoting of the central deflector is returned to one of the first and second positions by a return spring.

In a particularly advantageous version of the invention, each of the two lateral deflectors carries at its rear end an additional deflector which, when the three deflectors are mounted on a shield and arranged in the second position, is directed towards the outside of the vehicle.

This additional deflector further increases the aerodynamic efficiency of all the deflectors.

The invention also relates to a motor vehicle comprising a front shield and a deflector device as described previously.

Preferably, when in a preferred embodiment each of the two lateral deflectors carries at its rear end an additional deflector, when the three deflectors are in the second position, the additional deflector is located in a substantially vertical plane parallel to the transverse axis of the vehicle.

Preferably, in the second position, the outer edge of the additional deflector is located in a substantially vertical plane passing through the outer face of the front wheel of the vehicle.

Thus, this additional deflector minimizes the aerodynamic drag caused by the wheel.

Other features and advantages of the invention will appear throughout the following description.

These and other objects and advantages of the invention will be apparent from the following description, the accompanying drawings and the appended claims.

BRIEF DESCRIPTION OF THE ACCOMPANYING DRAWINGS

In the accompanying drawings, given by way of non-limiting examples:

DETAILED DESCRIPTION OF THE PREFERRED EMBODIMENTS

Figure 1:
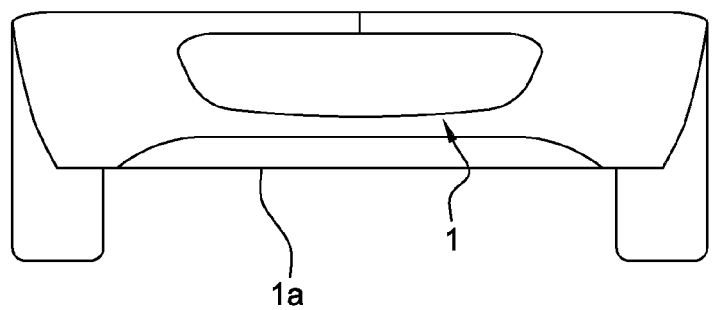
FIG. 1 is a partial front view of a motor vehicle according to the invention equipped with deflectors in the folded position under the front shield.
Figure 2:
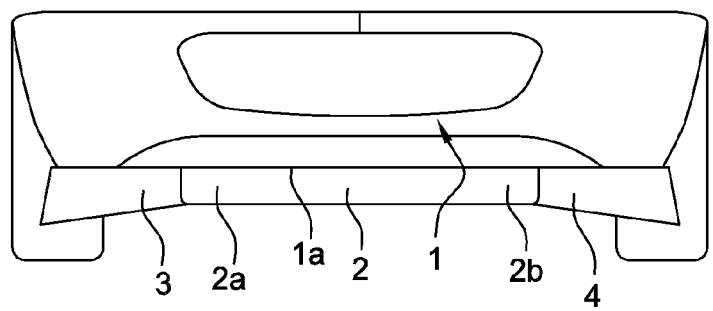
FIG. 2 is a view similar to FIG. 1 showing the deflectors in the unfolded position downwards.

FIGS. 1 and 2 show a motor vehicle whose front shield 1 comprises deflectors 2, 3, 4 mounted so as to be able to pivot between a position in which they are folded under the front shield 1 and a position (see FIG. 2) in which these deflectors 2, 3, 4 project downwards.

Figure 3:
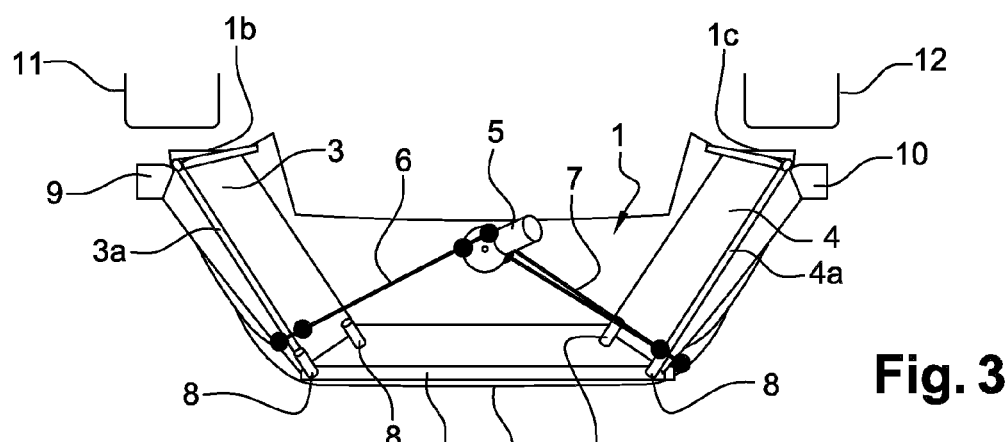
FIG. 3 is a view showing the underneath of the front shield of the vehicle, the deflectors in the folded position under the shield, the rods and the geared motor for controlling the pivoting of the deflectors.

According to the invention, the front shield 1 carries a central deflector 2 and two lateral deflectors 3, 4, the central deflector 2 extending, as shown on FIG. 3, near the front bottom edge 1a of the front shield 1 and each of the two lateral deflectors 3, 4 extending between a lateral end 2a, 2b of the central deflector 2 and a lower rear bottom edge 1b, 1c of the shield 1.

FIG. 2 also shows a preferred variant of the invention according to which the height of the lateral deflectors 3, 4 is equal to the height of the central shield at the ends of the lateral deflectors 3, 4 near the central deflector 2, the height increasing on moving away from the central deflector 2, so that these lateral deflectors 3, 4 are essentially higher than the central deflector 2 and closer to the road than the central deflector 2.

Each of the three deflectors 2, 3, 4 is mounted so as to be able to pivot (see FIG. 3) between a folded position under the shield 1 and a second position (see FIGS. 2 and 4) folded downwards substantially perpendicular to the first position.

FIG. 3 also shows that each of the two lateral deflectors 3, 4 is pivoted about an axis 3a, 4a forming an angle with the pivoting axis 2a of the central deflector 2.

This angle is such that the axes 2a, 3a, 4a of deflectors 2, 3, 4 lie within the outer contour of the front shield 1.

The deflectors 2, 3, 4 are substantially flat.

They can be made of plastic or metal.

When these deflectors 2, 3, 4 are folded against the top of the front shield 1, they can be completely invisible from the outside, as shown on FIG. 1.

The motor vehicle according to the invention also comprises means for controlling the pivoting of the three deflectors 2, 3, 4.

Figure 4:
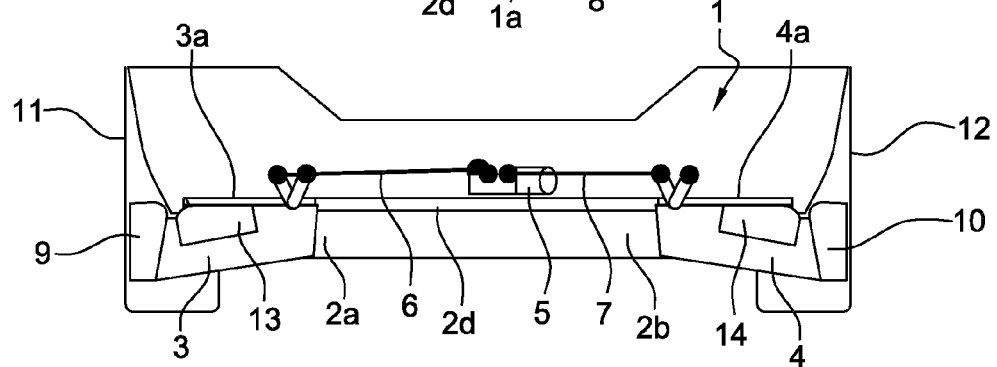
FIG. 4 is a view similar to FIG. 2 showing the lateral deflectors equipped with additional deflectors as well as the rods and the geared motor for controlling the pivoting of the deflectors.
Figure 5:
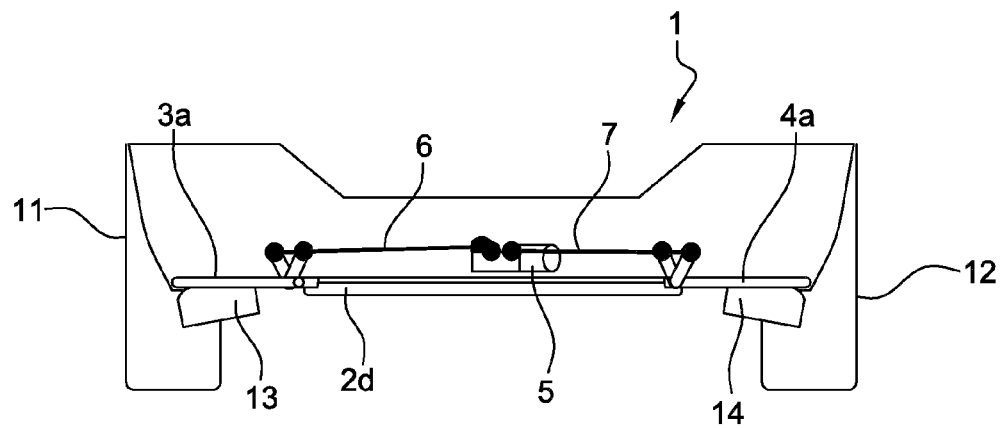
FIG. 5 is a view similar to FIG. 4 showing the deflectors in the folded position under the front shield.

In the example shown on FIGS. 3 to 5, these control means comprise a geared motor 5 and rods 6, 7 driven by the geared motor 5 and connected to the two lateral deflectors 3, 4.

The two lateral deflectors 3, 4 are each connected to the central deflector 2 by means for driving this central deflector 2 as they pivot between the first and second positions defined above.

In the example shown on FIG. 3, these means consist of pins 8 attached to one end of the lateral deflectors 3, 4 engaging on each of the edges 2a, 2b of the central deflector 2.

Thus, pivoting of the lateral deflectors 3, 4 also pivots the central deflector 2.

The pivoting of the central deflector 2 can also be returned to one of the first and second positions by a return spring.

In the example shown on FIGS. 3 and 4, each of the two lateral deflectors 3, 4 carries at its rear end an additional deflector 9, 10 which, when the three deflectors 2, 3, 4 are in the second position (see FIG. 4), is directed towards the outside of the vehicle.

In addition, when the three deflectors 2, 3, 4 are in this second position, the additional deflector 9, 10 is located in a substantially vertical plane parallel to the transverse axis of the vehicle.

Moreover, the outer edge 9a, 10a of the additional deflector 9, 10 is located in a substantially vertical plane located on the outer face of the front wheel 11, 12 of the vehicle.

This additional deflector 9, 10 therefore minimizes the aerodynamic drag exerted by the two front wheels 11, 12 of the vehicle.

In the example shown on FIGS. 4 and 5, the underneath of the front shield 1 also carries two fixed lateral deflectors 13, 14 which remain in place, projecting downwards, when the other deflectors 2, 3, 4 are folded against the underneath of the shield 1.

Obviously, the invention is not limited to the examples described above and numerous modifications can be made.

Figure 6:
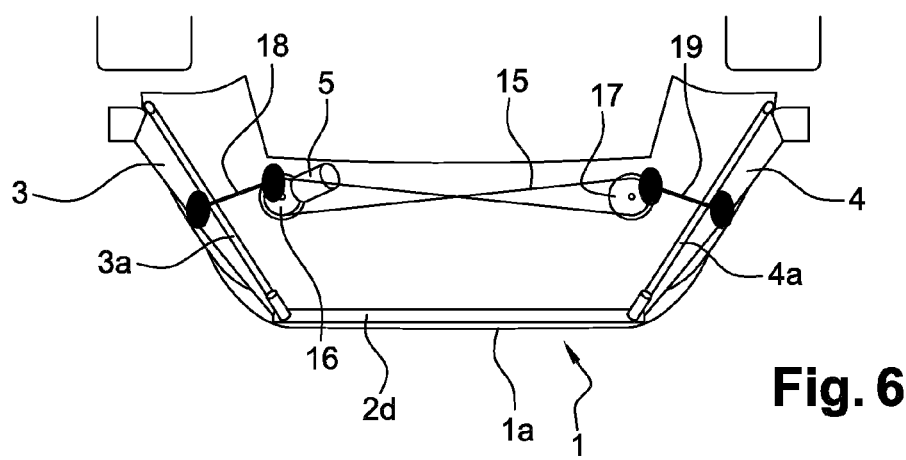
FIG. 6 is a view similar to FIG. 3 showing the deflectors in the unfolded position and a mechanism for controlling the pivoting consisting of cables and a geared motor.

Thus, the rods 6, 7 driven by the geared motor 5 can be replaced by a drive system comprising, as shown on FIG. 6, a cable 15 wound in a figure eight over two pulleys 16, 17, pulley 16 being driven by the geared motor 5.

These two pulleys 16, 17 are each connected to a rod 18, 19 which controls the pivoting of the lateral deflectors 3, 4.

Figure 7:
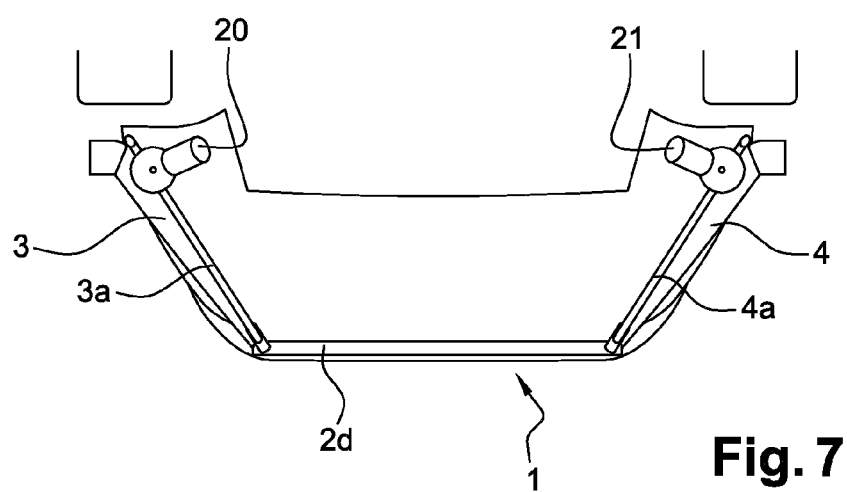
FIG. 7 is a view similar to FIG. 6 showing a mechanism for controlling the pivoting using two geared motors.

In the example shown on FIG. 7, the drive system using rods or cables is replaced by two geared motors 20, 21 which are each connected directly to the pivoting axis 3a, 4a of the lateral deflectors 3, 4.

The pivoting of the three deflectors 2, 3, 4 can be triggered by a push button operated by the vehicle driver.

This pivoting can also be operated automatically when the vehicle exceeds a certain speed.

The vehicle that has just been described has many advantages.

The three deflectors 2, 3, 4 and the two additional deflectors 9, 10, when in the active position, shown on FIG. 4, considerably reduce the drag of the vehicle when it is travelling at high speed.

This advantage is especially important in the case of 4-wheel drive type vehicles which have a high ground clearance and on which deflectors having a height of up to 140 mm can be fitted.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A mobile deflector device of a curved vehicle shield, comprising a central deflector and two lateral deflectors, essentially forming three chords distributed over an entire length of said curved vehicle shield, each of said three deflectors being mounted so as to be able to pivot between a first folded position and a second unfolded position substantially perpendicular to said first folded position, wherein in said second unfolded position, the low points of said two lateral deflectors are lower than that of said central deflector.

2. The mobile deflector device according to claim 1, wherein an edge of a lateral deflector in contact with said central deflector has a low point aligned with a low point of said central deflector.

3. The mobile deflector device according to claim 1, wherein each of said two lateral deflectors is pivoted about an axis forming an angle with a pivoting axis of said central deflector.

4. The mobile deflector device according to claim 1, wherein said mobile deflector device further comprises means for controlling the pivoting of said three deflectors, said control means comprising at least one geared motor and rods or cables driven by said at least one geared motor and connected to said two lateral deflectors.

5. The mobile deflector device according to claim 1, wherein said mobile deflector device further comprises means for controlling the pivoting of said three deflectors, said control means comprising two geared motors, each of the latter being directly connected to one of said two lateral deflectors.

6. A mobile deflector device of a curved vehicle shield, comprising a central deflector and two lateral deflectors, essentially forming three chords distributed over an entire length of said curved vehicle shield, each of said three deflectors being mounted so as to be able pivot between a first folded position and a second unfolded position substantially perpendicular to said first folded position;
wherein said mobile deflector device further comprises means for controlling the pivoting of said three deflectors, said control means comprising at least one geared motor and rods or cables driven by said at least one geared motor and connected to said two lateral deflectors;
wherein said two lateral deflectors are each connected to said central deflector by means for driving said central deflector as they pivot between said first folded position and said second unfolded position.

7. A mobile deflector device of a curved vehicle shield, comprising a central deflector and two lateral deflectors, essentially forming three chords distributed over an entire length of said curved vehicle shield, each of said three deflectors being mounted so as to be able pivot between a first folded position and a second unfolded position substantially perpendicular to said first folded position;
wherein said mobile deflector device further comprises means for controlling the pivoting of said three deflectors, said control means comprising at least one geared motor and rods or cables driven by said at least one geared motor and connected to said two lateral deflectors;
wherein the pivoting of said central deflector is returned to one of said first folded position and said second unfolded position by a return spring.

8. A mobile deflector device of a curved vehicle shield, comprising a central deflector and two lateral deflectors, essentially forming three chords distributed over an entire length of said curved vehicle shield, each of said three deflectors being mounted so as to be able pivot between a first folded position and a second unfolded position substantially perpendicular to said first folded position;
wherein each of said two lateral deflectors carries at its rear end an additional deflector which, when said three deflectors are mounted on a shield and arranged in said second unfolded position, is directed towards an outside of a vehicle.

9. A motor vehicle comprising a front shield and a mobile deflector device according to claim 1.

10. The mobile deflector device according to claim 2, wherein each of said two lateral deflectors is pivoted about an axis forming an angle with a pivoting axis of said central deflector.

11. The mobile deflector device according to claim 6, wherein said mobile deflector device further comprises means for controlling the pivoting of said three deflectors, said control means comprising at least one geared motor and rods or cables driven by said at least one geared motor and connected to said two lateral deflectors.

12. The mobile deflector device according to claim 2, wherein said mobile deflector device further comprises means for controlling the pivoting of said three deflectors, said control means comprising at least one geared motor and rods or cables driven by said at least one geared motor and connected to said two lateral deflectors.

13. The mobile deflector device according to claim 3, wherein said mobile deflector device further comprises means for controlling the pivoting of said three deflectors, said control means comprising at least one geared motor and rods or cables driven by said at least one geared motor and connected to said two lateral deflectors.

14. The mobile deflector device according to claim 6, wherein said mobile deflector device further comprises means for controlling the pivoting of said three deflectors, said control means comprising two geared motors, each of the latter being directly connected to one of said two lateral deflectors.

15. The mobile deflector device according to claim 2, wherein said mobile deflector device further comprises means for controlling the pivoting of said three deflectors, said control means comprising two geared motors, each of the latter being directly connected to one of said two lateral deflectors.

16. The mobile deflector device according to claim 3, wherein said mobile deflector device further comprises means for controlling the pivoting of said three deflectors, said control means comprising two geared motors, each of the latter being directly connected to one of said two lateral deflectors.

17. A mobile deflector device of a curved vehicle shield, comprising a central deflector and two lateral deflectors, essentially forming three chords distributed over an entire length of said curved vehicle shield, each of said three deflectors being mounted so as to be able pivot between a first folded position and a second unfolded position substantially perpendicular to said first folded position;
wherein said mobile deflector device further comprises means for controlling the pivoting of said three deflectors, said control means comprising two geared motors, each of the latter being directly connected to one of said two lateral deflectors;
wherein said two lateral deflectors are each connected to said central deflector by means for driving said central deflector as they pivot between said first folded position and said second unfolded position.

18. A mobile deflector device of a curved vehicle shield, comprising a central deflector and two lateral deflectors, essentially forming three chords distributed over an entire length of said curved vehicle shield, each of said three deflectors being mounted so as to be able pivot between a first folded position and a second unfolded position substantially perpendicular to said first folded position;

wherein said mobile deflector device further comprises means for controlling the pivoting of said three deflectors, said control means comprising two geared motors, each of the latter being directly connected to one of said two lateral deflectors;

wherein the pivoting of said central deflector is returned to one of said first folded position and said second unfolded position by a return spring.

19. A mobile deflector device of a curved vehicle shield, comprising a central deflector and two lateral deflectors, essentially forming three chords distributed over an entire length of said curved vehicle shield, each of said three deflectors being mounted so as to be able pivot between a first folded position and a second unfolded position substantially perpendicular to said first folded position;

wherein in said second unfolded position , the low points of the said two lateral deflectors are lower than that of said central deflectors;

wherein each of said two lateral deflectors carries at its rear end an additional deflector which, when said three deflectors are mounted on a shield and arranged in said second unfolded position, is directed towards an outside of a vehicle.

\* \* \* \* \*

UNITED STATES PATENT AND TRADEMARK OFFICE
CERTIFICATE OF CORRECTION

PATENT NO. : 9,540,056 B2
APPLICATION NO. : 14/420154
DATED : January 10, 2017
INVENTOR(S) : Guinois et al.

Page 1 of 1

It is certified that error appears in the above-identified patent and that said Letters Patent is hereby corrected as shown below:

In the Claims

Column 5, Line 28, insert -- to. -- after "able".
Column 5, Line 45, insert -- to -- after "able".
Column 5, Line 61, insert -- to -- after "able".
Column 6, Line 49, insert -- to -- after "able".
Column 6, Line 65, insert -- to -- after "able".
Column 7, Line 15, insert -- to -- after "able".
Column 7, Line 18, delete "position ,the" and insert -- position, the -- therefor.
Column 7, Line 19, delete "the".
Column 7, Line 20, delete "deflectors;" and insert -- deflector; -- therefor.

Signed and Sealed this
Seventh Day of March, 2017

Michelle K. Lee
*Director of the United States Patent and Trademark Office*